Patented Dec. 27, 1927.

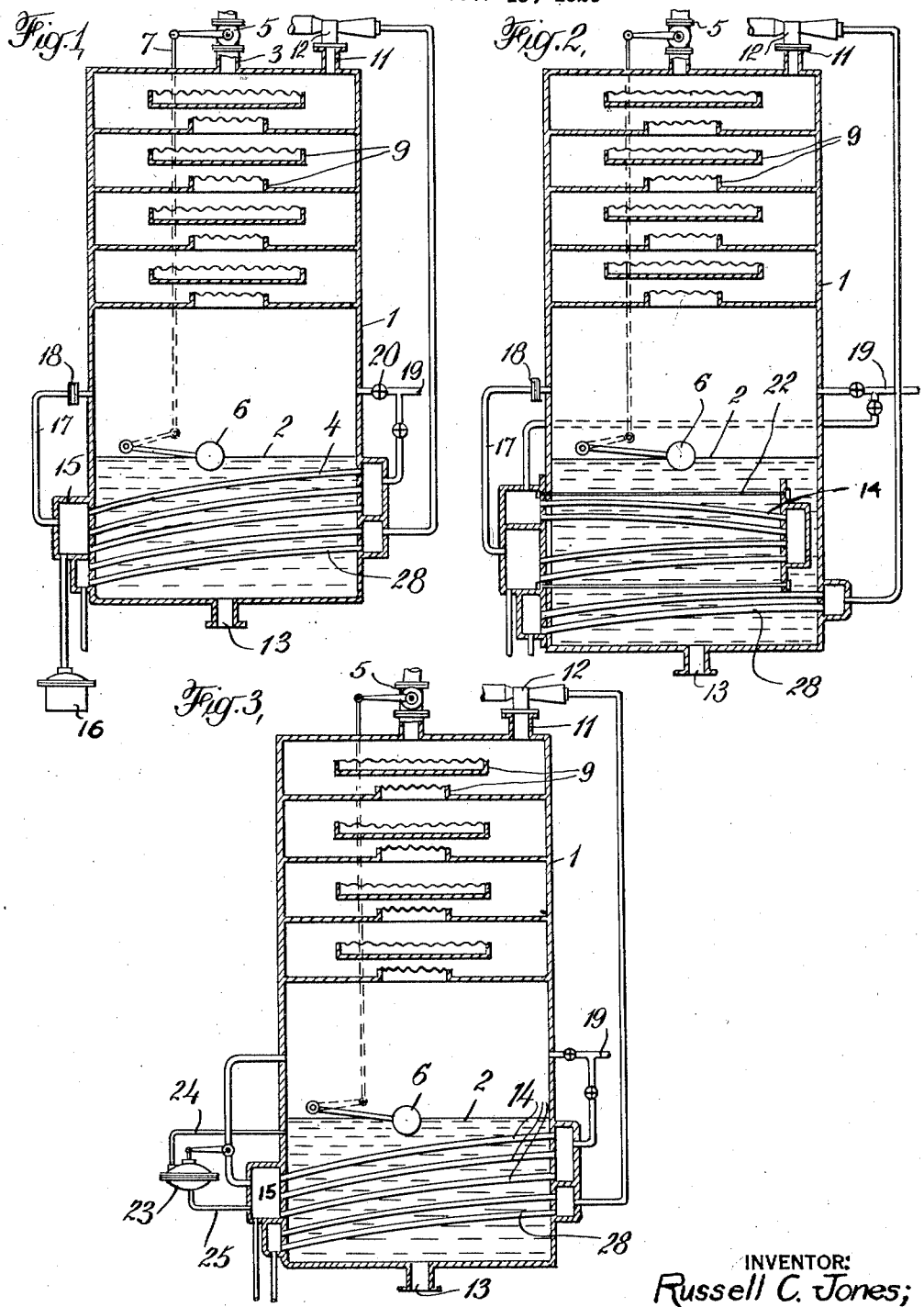

1,654,262

UNITED STATES PATENT OFFICE.

RUSSELL C. JONES, OF BRONXVILLE, NEW YORK, ASSIGNOR TO THE GRISCOM-RUSSELL COMPANY, OF NEW YORK, N. Y., A CORPORATION OF DELAWARE.

DEAERATOR.

Application filed October 15, 1926. Serial No. 141,695.

The present invention relates to deaerating apparatus for steam generating systems and has to do with the furnishing of substantially gas free water to the boilers.

Water as supplied to a steam generating plant usually contains relatively large quantities of gases in solution. These various gases, notably oxygen, which are dissolved in the feed water are liberated in the boilers and other parts of the apparatus under the conditions to which the water is subjected and react on the metal of the various apparatus with the result that pitting and corroding occur. It is therefore common practice to subject the boiler feed water to a degassing treatment before the water is admitted to the boilers in order that the injurious gases may be removed from solution and expelled from the system.

Various types of apparatus for deaerating boiler feed water have been proposed. For instance, it has been proposed to deaerate the water in an apparatus consisting of two chambers through which the water passes in series relation. The first of these chambers is a heating chamber and in this chamber the water is heated to a temperature approaching its boiling point under the pressure conditions maintained in that chamber. The heated water from this chamber is then admitted to the second chamber where ebullition occurs, either as the result of additional heating steam admitted to the second chamber, or as the result of reduced pressure in the second chamber in which latter case ebullition occurs by reason of the contained heat of the liquid. It has also been proposed to deaerate water by dripping it upon a heated surface in which case the liquid is usually sprayed upon a bundle of heating tubes so that the liquid runs over the tube surfaces in the form of a thin film and is heated by reason of its contact with the tubes. Deaeration is satisfactorily accomplished if the liquid to be deaerated is heated to its boiling point corresponding to the pressure under which it is maintained and is then allowed to remain subjected to these conditions for a sufficient length of time to permit all of the contained gases to remove themselves from the liquid.

In copending application Serial No. 600,178, filed November 10, 1922, in the name of Joseph Price and assigned to the present assignee, there is disclosed a deaerating apparatus which consists of a containing shell in the bottom of which is maintained a principal body of the liquid under treatment. The water to be deaerated is admitted at the top of the chamber and falls over a series of baffles until it eventually reaches the principal liquid body in the lower part of the apparatus. Heating steam is preferably admitted by means of a perforated pipe submerged in the liquid body so that the bubbling of the steam through the liquid will effect an agitation and will thus assist in bringing the solution to equilibrium and consequently in effecting complete removal of dissolved gases. The present invention is in a sense, a development and improvement on the apparatus disclosed in this copending application.

In the present apparatus, the liquid is admitted at the upper portion of the unit and falls downwardly through the apparatus over a series of baffles which thoroughly agitate it and distribute it as a rain of falling drops, and the liquid eventually accumulates in a principal body of liquid, in the lower part of the apparatus. Steam is allowed to expand through this rain, and would serve, according to the commonly accepted idea, to sufficiently deaerate the incoming liquid. However, since this is not actually the case, the present invention contemplates also providing a heating unit consisting of a plurality of heat transferring tubes submerged in the principal liquid body, and heating steam is pasesd through these tubes at a relatively high velocity. This heating element causes ebullition of the liquid body, and thus makes for thorough scrubbing or removal of gases from the liquid body. The major portion of the steam admitted to the heating tubes passes the tubes uncondensed, and this steam is then brought into direct contact with the incoming water to thus effect the always necessary preheating of the water. A slight pressure difference is preferably maintained between the interior of the heating element and the interior of the deaerating chamber to give a slight increase in temperature and thus insure boiling of the liquid in the lower part of the apparatus.

The invention also contemplates using an ejector to effect removal of the uncondensable gases from the apparatus. By passing this steam into a heating element submerged in the principal liquid body in the lower part of the deaerator, the necessary ebullition may be wholly or in part accomplished by the use of the waste steam from the ejector. This steam is preferably handled in a separate bank of tubes in the lower part of the apparatus so that it will not contaminate the other heating steam with undesirable gases.

The accompanying drawings illustrate a preferred embodiment of the invention. In these drawings:

Fig. 1 is a sectional view, showing the heating element and the means for admission of steam;

Fig. 2 is a modification of the apparatus shown in Fig. 1, and

Fig. 3 is a still further modification of the apparatus shown in Fig. 1.

Referring to the drawings by numeral, 1 indicates the containing shell or housing of the deaerator, in the lower portion of which the main body of liquid under treatment, 2, according to the improved purpose of the present invention, is normally maintained. The incoming water enters at the top of the apparatus through pipe line 3, and a valve 5 in this line operated through a linkage 7 by means of a float 6 regulates for substantially constant liquid level in the apparatus. The incoming liquid which in subsistent types is the only part of the feed water receiving treatment, passes down the length of the apparatus over a series of baffles 9. Alternate baffles, as shown, are provided with openings, and the intermediate baffles are provided with annular passages at their outer edges, so that the steam and uncondensable gases arising through the apparatus follow a tortuous path, and are thus brought into repeated and intimate contact with the liquid spray descending through the apparatus. The uncondensable gases are drawn out of the apparatus through the vent or discharge line 11. Withdrawal of these gases is preferably effected by means of a steam ejector 12 connected to the line 11 as shown. Deaerated water may be conducted off through a pipe line 13 provided near the bottom of the shell 1.

According to the present invention, in order to preclude any possibility of there being any gases at all left in the feed water, there is submerged in the principal body of liquid in the lower portion of the apparatus, a bank of heating tubes 14. These tubes preferably extend between rigidly spaced headers 15 as shown and may be slightly bowed so that by subjection to a material change in temperature, the tubes will flex and will thus loosen and crack off deposits of scale which may have accumulated on them. A trap 16 is provided to conduct off condensate from the discharge header of the tube element. The steam employed in the heating tubes 14 may be derived directly from the boiler or from any other convenient source. The amount of steam admitted to the tubes 14 is such that but a small proportion of it will be condensed in its passage through the tubes. It is always conducted through the tubes at a relatively high velocity and thus affords a correspondingly high efficiency of heat transfer.

The steam passing the heat transferring tubes 14 uncondensed enters line 17, from whence it is passed into the interior of the deaerating chamber through the medium of the orifice plate 18. The size of the orifice in the plate 18 is so chosen as to maintain a slight pressure difference between the steam within the tubes 14 and that within the deaerator shell 1. This pressure differential may be from, say, one to five pounds per square inch. In this fashion a slight temperature difference is maintained between the steam within the heating tubes 14 and the water in the shell, which difference is sufficient to insure ebullition of the liquid body in the shell with the result that effective scrubbing or mechanical removal of liberated air from the water in the bottom of the shell is accomplished. The steam entering the deaerating chamber through the orifice plate 18 comes immediately into direct contact with the incoming water flowing down over the baffle plates 9.

The present invention further contemplates the employment of a separate bank 28 of submerged steam tubes which derive their supply of steam from the steam ejector 12, provided at the upper portion of the apparatus for exhausting the uncondensable gases from the deaerator. This steam aids in the heating of the liquid by the tubes 14, and at the same time, assists in the production of the desired ebullition which is essential to the scrubbing of the liquid under treatment. A separate bank 28 of heating tubes is employed for the reason that the steam coming from the ejector is contaminated with large quantities of undesirable gases, and for this reason, should not be admixed with the steam which is to be admitted into the deaerating chamber.

For the purpose of affording an efficient heat transfer, a high velocity of steam within the heating tubes 14 is desirable. This effect may be furthered by the provision of a multi-pass heating unit of the type shown in Fig. 2. In this figure, a 2-pass unit is shown, and the steam is caused to travel the length of the unit twice at a relatively high velocity before it is passed along to the line 17 and orifice plate 18. In this figure, the heating element is built within the deaerating chamber and is provided with stay rods 22 for the purpose of rigidly spacing the tube sheets, so that flexure of the tubes to produce a scale-cracking action is obtained. It is to be noted that this type of heating element construction may be employed either with a single pass, or a multi-pass unit. In Fig. 3, there is illustrated an automatic valve 23 for maintaining a substantially constant pressure and temperature differential between the submerged heating element and the deaerating chamber. The valve here shown is a diaphragm valve having lines 24 and 25 communicating respectively with the pressure on the deaerating chamber and the pressure in the submerged heating element, so that the valve will regulate for a constant pressure differential, with the result that a substantially constant temperature differential will also be maintained.

Ordinarily, all of the steam is passed through the tubes 14, and then into the deaerating chamber through the orifice plate 18, excepting of course, that portion of the steam which is condensed, and is withdrawn through the trap 16 under certain circumstances. It may, however, be desirable to admit a certain amount of steam directly to the deaerating chamber without first causing it to traverse the heating tubes 14. With this situation, the valve 20 in steam line 19 is opened to a certain extent and a desired amount of steam is admitted directly into the deaerating chamber, while at the same time, a predetermined portion of the steam passes down through the line 21 and enters the submerged heating element 14, after which the uncondensed portion of the steam finds its way through line 17 and orifice plate 18 into the deaerating chamber 1. The valve 20 is a pressure reducing valve designed to maintain in the deaerating chamber a pressure corresponding to that to which the orifice plate 18 is intended to regulate. The pressure in the deaerator should be slightly below that in the heating tubes 14, for the purpose of establishing the desired temperature differential in maintaining a continuous and satisfactory ebullition of the liquid body 2.

By means of the present invention, all of the available heat in the steam discharged from the ejector is utilized in the system and the discharge temperature of this steam will ordinarily be high enough to effect an unusually increased ebullition of the liquid body 2, maintained in the lower part of the deaerator.

The present application is in part a divisional application of the copending application of R. C. Jones, filed September 2, 1925, Ser. No. 54,583.

I claim:

1. A deaerating apparatus, comprising a containing shell, means for normally maintaining a body of liquid in the lower portion of said shell, means for admitting incoming liquid at the upper portion of said shell and allowing it to fall under the influence of gravity into the lower portion of the shell, a heating element submerged in the liquid within said shell, means for supplying heating steam to said submerged heating element to effect ebullition of the liquid within said shell, means for conducting steam passing said heating element uncondensed into the containing shell above the liquid level therein, and means for maintaining a pressure differential between said submerged heating element and said containing shell, comprising an orifice plate maintaining a fixed and constant flow introduced into the line between the discharge end of said submerged heating element and said containing shell to thereby restrict the flow of steam from said heating element into said shell.

2. Deaerating apparatus, comprising a containing shell, means for normally maintaining a body of liquid in the lower portion of said shell, means for admitting incoming liquid to said shell, a steam ejector for withdrawing uncondensable gases from the apparatus, a submerged heating element for receiving the steam discharged from said ejector and transferring heat therefrom to the body of liquid in the shell, to thereby effect ebullition of said liquid, a second submerged heating element, means for supplying heating steam to said second heating element, and means for delivering to said containing shell, steam passing said second submerged heating element uncondensed.

3. Deaerating apparatus, comprising a containing shell, means for normally maintaining a body of liquid in the lower portion of said shell, means for admitting incoming liquid to said shell, a steam ejector for withdrawing uncondensable gases from the apparatus, a submerged heating element for receiving the steam discharged from said ejector and transferring heat therefrom to the body of liquid in the shell to thereby effect ebullition of said liquid, a second submerged heating element, means for supplying heating steam to said second heating element, and means for delivering to said containing shell, steam passing said second submerged heating element uncondensed, said means comprising a valve interposed between the discharge end of said submerged heating element and the interior of said containing shell, said valve being actuated by the pressure difference between said heating element and said shell.

4. Deaerating apparatus comprising a containing shell, means for normally maintaining a body of liquid in the lower portion of said shell, means for admitting incoming liquid to said shell, a steam ejector for withdrawing uncondensable gases from the apparatus, a submerged heating element for receiving the steam discharged from said ejector and transferring heat therefrom to the body of liquid in the shell, to thereby effect ebullition of said liquid, a second submerged heating element, and means for supplying heating steam to said second heating element.

In testimony whereof I affix my signature.

RUSSELL C. JONES.